（12）United States Patent
Muramatsu et al.

(10) Patent No.: US 6,659,436 B2
(45) Date of Patent: Dec. 9, 2003

(54) PNEUMATICALLY OPERATED ACTIVE VIBRATION DAMPING DEVICE AND VIBRATION DAMPING APPARATUS USING THE SAME

(75) Inventors: Atsushi Muramatsu, Komaki (JP); Hiroyuki Ichikawa, Kani (JP); Syouji Akasa, Ichinomiya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/241,217

(22) Filed: Sep. 10, 2002

(65) Prior Publication Data

US 2003/0047856 A1 Mar. 13, 2003

(30) Foreign Application Priority Data

Sep. 13, 2001 (JP) ........................................ 2001-278761

(51) Int. Cl.⁷ .............................. F16F 15/02; F16F 13/26
(52) U.S. Cl. ................................................. 267/140.13
(58) Field of Search ....................... 267/140.11, 140.14, 267/140.15

(56) References Cited

U.S. PATENT DOCUMENTS 6,176,477 B1 * 1/2001 Takeo et al. ........... 267/140.11
6,206,351 B1    3/2001 Hamada et al.
6,264,181 B1 * 7/2001 Muramatsu et al. ... 267/140.14

FOREIGN PATENT DOCUMENTS

| JP | 10-184769 | 7/1998 |
| JP | 10-238587 | 9/1998 |
| JP | 11-82611  | 3/1999 |

* cited by examiner

Primary Examiner—Christopher P. Schwartz
(74) Attorney, Agent, or Firm—Beyer Weaver & Thomas, LLP (57) ABSTRACT

Disclosed is a pneumatically operated fluid-filled active vibration-damping device including: a primary fluid chamber partially defined by an elastic body and filled with a non-compressible fluid; a movable member being elastically displaceable and partially defining the primary fluid chamber its one side; a working air chamber disposed on the other side of the movable member; and an air reservoir directly extending from the working air chamber and fluid-tightly closed at its protruding end portion. A fluid pressure variation in the primary fluid chamber is induced by an elastic deformation of the elastic body while being actively controlled by transmitting an air pressure variation applied to the working air chamber from an external area to the primary fluid chamber via the movable member. A vibration-damping apparatus using the vibration-damping device is also disclosed.

11 Claims, 6 Drawing Sheets

PNEUMATICALLY OPERATED ACTIVE VIBRATION DAMPING DEVICE AND VIBRATION DAMPING APPARATUS USING THE SAME

INCORPORATED BY REFERENCE

The disclosure of Japanese Patent Application No. 2001-278761 filed on Sep. 13, 2001 including the specification, drawings and abstract is incorporated herein by reference in its entirety.

BACKGROUND OF THE INVENTION

1. Field of the Invention

The present invention relates generally to a fluid-filled active vibration-damping device, which has a primary fluid chamber filled with a non-compressible fluid, and which is capable of actively offsetting or reducing vibrations applied to the primary fluid chamber by controlling a fluid pressure in the primary fluid chamber. More particularly, the present invention is concerned with a pneumatically operated fluid-filled active vibration-damping device wherein the fluid pressure in the primary fluid chamber is controlled by means of an air pressure applied thereto from the external area, and an active vibration-damping apparatus equipped with the same, which is suitably applicable to an active elastic mount and an active dynamic damper or oscillator for use in automotive vehicles, for example.

2. Description of the Related Art

Vibration-damping devices have been used for damping or isolating vibrations (including noises induced by the vibrations) of a subject member such as a body of an automotive vehicle or other members suffering from these vibrations or noises. Known examples of such vibration-damping devices include: a vibration-damping coupling or mount, e.g., an engine mount, which is interposed between the subject member and a vibration source, e.g., a power unit, so as to connect these two members in a vibration-damping fashion for eliminating or reducing a vibration transmitted from the vibration source to the subject member; and a vibration damper that is fixed to the subject member for absorbing or reducing the vibration of the subject member.

A fluid-filled active vibration-damping device has been proposed as one type of such vibration-damping devices, as disclosed in JP-A-10-184769. The known fluid-filled active vibration-damping device includes: an elastic body elastically deformed due to vibrational loads applied thereto; a primary fluid chamber partially defined by the elastic body and an elastically displaceably movable member, while being filled with a non-compressible fluid; and a working air chamber formed on one side of the movable member that is remote from the other side on which the primary fluid chamber is formed. The pressure of the fluid in the primary fluid chamber varies due to the elastic deformation of the elastic body upon application of the vibrational loads to the elastic body, and is also actively controllable by applying a suitable air pressure variation to the working air chamber from the external area, which is transmitted to the primary fluid chamber via the movable member. Such a known fluid-filled active vibration-damping device is capable of actively controlling a fluid pressure variation induced in the primary fluid chamber by applying an air pressure variation corresponding to a vibration to be damped, thereby exhibiting an active vibration-damping effect or an offsetting effect with respect to vibrations excited in the subject member to which the fluid-filled active vibration-damping device is installed.

In order to induce a suitable air pressure variation in the working air chamber, the known fluid-filled active vibration-damping device generally employs a vacuum source such as a negative pressure available from an air intake part of an internal combustion engine and an atmosphere as pressure sources, and a solenoid-operated switch valve operable for alternately connecting and disconnecting the working air chamber to and from the vacuum source and the atmosphere at a frequency corresponding to that of vibrations to be damped. However, the known fluid-filled active vibration-damping device is incapable of confirming a waveform of the air pressure variation induced in the working air chamber to a waveform of amplitude of vibrations to be damped, causing undesirable generation of higher harmonic components of a primary frequency of the air pressure variation generated in the working air chamber. The higher harmonic components are undesirably transmitted to the primary fluid chamber, causing deterioration of a vibration-damping capability of the fluid-filled active vibration-damping device.

To cope with the above-mentioned conventional problem, the present assignee has disclosed in JP-A-11-82611 an improved fluid-filled active vibration-damping device in which a resonance pipe or the like is connected to a portion of an air piping system provided for applying the air pressure variation to the working air chamber, for the purpose of reducing or attenuating the higher harmonic components included in the air pressure variation.

However, extensive studies conducted by the present inventors has revealed that the improved fluid-filled active vibration-damping device needs to branch a pipe in the air piping system with a branch pipe or the like for disposing the resonance pipe on the portion of the air piping system, or to form a special port in the solenoid-operated switch valve in order to connect the resonance pipe to the solenoid-operated switch valve, thus deteriorating efficiency in manufacturing the air piping system. Also, additional spaces are required on the air piping system for an installation such a branch pipe, a special port and the like, making it difficult to install the improved fluid-filled active vibration-damping device on any automotive vehicle by simply changing the design of the vibration-damping device.

In addition, even if the resonance pipe is disposed on the portion of the air piping system, the fluid-filled active vibration-damping device may still possibly suffer from generation of the higher harmonic components in the air pressure variation transmitted through the air piping system, due to the presence of bending or narrowed portions in an air passage of the air piping system located between the portion at which the resonance pipe is connected to the pipe in the air piping system and the working air chamber. That is, the improved fluid-filled active vibration-damping device is not able to cope with the problem of such higher harmonic components in the air pressure variation, leaving some room for improvement.

SUMMARY OF THE INVENTION

It is therefore an object of the present invention to provide an improved pneumatically operated fluid-filled active vibration-damping device, which is capable of eliminating or minimizing generation of higher harmonic components of a primary frequency of an air pressure variation in the working air chamber while simplifying the structure of the damping device and eliminating a need for a special modification to an air piping system, and accordingly which is capable of exhibiting a desired active vibration-damping effect with high stability.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A pneumatically operated fluid-filled active vibration-damping device comprising: (a) an elastic body elastically deformed due to vibrational loads applied thereto; (b) a primary fluid chamber partially defined by the elastic body and filled with a non-compressible fluid; (c) a movable member being elastically displaceable and partially defining the primary fluid chamber on one of opposite sides thereof; (d) a working air chamber disposed an other one of opposite sides of the movable member; and (e) an air reservoir directly extending from the working air chamber and fluid-tightly closed at a protruding end portion thereof; wherein a fluid pressure variation in the primary fluid chamber is induced by an elastic deformation of the elastic body while being actively controlled by transmitting an air pressure variation applied to the working air chamber from an external area to the primary fluid chamber via the movable member.

In the pneumatically operated fluid-filled active vibration-damping device according to the present mode of the invention, the air reservoir is formed so as to directly extend from the working air chamber of the vibration-damping device. This arrangement eliminates a need to modify an air piping system provided outside the vibration-damping device for applying the air pressure variation to the working air chamber. That is, the present pneumatically operated fluid-filled active vibration-damping device is capable of reducing or attenuating higher harmonic components of a primary frequency of the air pressure variation in the working air chamber based on a resonance effect of the air reservoir, without needing a design change of the air piping system or an increased space for installing the air piping system.

In addition, the air reservoir is directly open to the working air chamber in the pneumatically operated active fluid-filled vibration-damping device of this mode of the invention, thus making it possible to more efficiently reduce the higher harmonic components of the primary frequency of the pressure variation induced in the working air chamber, in comparison with the above-mentioned conventional case where the resonance pipe or the like is connected to a portion of the air piping system provided outside of the vibration-damping device.

(2) A pneumatically operated fluid-filled active vibration-damping device according to the above-indicated mode (1), wherein a wall of the working air chamber is formed with a first outlet adapted to be connected with a closed tubular pipe for forming the air reservoir, and a second outlet adapted to be connected with an air piping system for applying the air pressure variation to the working air chamber. According to this mode of the invention, the use of the closed tubular pipe makes it possible to form the air reservoir having a longitudinal configuration, with ease. For instance, the air reservoir may have a desired effective length by simply replacing the closed tubular pipe. Preferably, a pocket having a volume smaller than that of the working air chamber is formed to be open in a portion of the wall of the working air chamber, and the first and second outlets are formed at respective portions of the pocket. This arrangement ensures that the higher harmonic components in the air pressure variation to be applied to the working air chamber are effectively reduced or attenuated within the pocket based on the resonance effect of the air reservoir, before the higher harmonic components are transmitted to the entire of the working air chamber.

(3) A pneumatically operated fluid-filled active vibration-damping device according to the above-indicated mode (1) or (2), wherein the movable member has an elasticity by which the movable member is restored to an initial shape thereof. According to this mode of the invention, the movable member may be a plate member formed of a rubber elastic body with a given thickness, for example. This makes it easy to dispose in position the movable member while ensuring a fluid-tightness of the primary fluid chamber, and facilitates the oscillation of the movable member by alternately apply the negative pressure and the atmospheric pressure to the working air chamber.

(4) A pneumatically operated fluid-filled active vibration-damping device according to any one of the above-indicated modes (1)–(3), wherein the primary fluid chamber includes a pressure-receiving chamber partially defined by the elastic body and an oscillating chamber partially defined by the movable member, the pressure-receiving chamber and the oscillating chamber are held in fluid communication with each other via an orifice passage. According to this mode of the invention, the fluid pressure variation in the oscillating chamber, caused by the oscillation of the movable member as a result of the air pressure variation induced in the working air chamber, is efficiently transmitted to the pressure-receiving chamber with the help of resonance of the fluid flowing through the orifice passage. Therefore, the fluid pressure variation in the pressure-receiving chamber can be efficiently controlled.

(5) A pneumatically operated fluid-filled active vibration-damping device according to any one of the above-indicated modes (1)–(4), further comprising a first mounting member and a second mounting member that are elastically connected with each other via the elastic body, wherein the first mounting member is adapted to be attached to a vibrative member and the second mounting member is adapted to be attached to a subject member whose vibrations to be damped so that the vibration-damping device is interposed between the vibrative member and the subject member for elastically connecting the vibrative member and the subject member in a vibration-damping fashion. The pneumatically operated fluid-filled active vibration-damping device according to this mode of the invention can provide effectively vibration-damping devices for use in an automotive vehicle, such as an engine mount, a differential mount, a body mount, a suspension mount and a suspension bushing.

(6) A pneumatically operated fluid-filled active vibration-damping device according to the above-indicated mode (5) wherein the elastic body has a generally frusto-conical shape and is bonded at a small diameter end portion thereof to the first mounting member, and the second mounting member having a cylindrical portion, while one of axially opposite open ends of the cylindrical portion of the second mounting member is bonded to an outer circumferential surface of a large diameter end portion of the elastic body to be fluid-tightly closed, and an other one of axially opposite open ends of the cylindrical portion of the second mounting member is fluid-tightly closed by a flexible diaphragm elastically deformable, the vibration damping device further comprising: a partition member fixedly disposed within a bore of the cylindrical portion of the second mounting member such that the partition member extends in a radial direction perpendicular to an axis of the cylindrical portion so as to form the primary fluid chamber partially defined by the elastic body on one of opposite sides thereof and an auxiliary fluid chamber whose volume is variable partially defined by the flexible diaphragm and filled with the non-compressible fluid on an other one of opposite sides thereof; and a fluid passage for permitting a fluid communication between the primary fluid chamber and the auxiliary fluid chamber, wherein the partition member includes a recess open to the primary fluid chamber and being closed by the movable member so as to form the working air chamber on one of opposite sides of the movable member, which is remote from the primary fluid chamber, the air piping system and the air reservoir being open in an inner surface of the recess of the partition member. According to this mode of the invention, the primary fluid chamber partially defined by the elastic body and the movable member, and the working air chamber partially defined by the movable member, are made simple in construction and are formable with ease. Moreover, the vibration-damping device according to this mode of the invention can exhibit a passive damping effect with the help of resonance of the fluid flowing through the fluid passage due to the pressure difference between the primary and auxiliary fluid chambers, with respect to vibrations within a specific vibration range.

(7) A pneumatically operated fluid-filled active vibration-damping device according to the above-indicated mode (6), wherein the partition member includes a first groove open in an outer circumferential surface thereof, and an opening of the first groove is closed by the cylindrical portion of the second mounting member so as to at least partially form the air reservoir. This arrangement makes it possible to form at least partially the air reservoir within the cylindrical portion of the vibration-damping device. Namely, the air reservoir can be formed, while preventing enlargement of the vibration-damping device itself and its installation space.

(8) A pneumatically operated fluid-filled active vibration-damping device according to the above-indicated mode (7), wherein the partition member further includes a second groove open in an outer circumferential surface thereof and independent of the first groove, and an opening of the second groove is fluid-tightly closed by the cylindrical portion of the second mounting member so as to form the fluid passage. According to this mode of the invention, the fluid passage as well as the air reservoir can be formed within the cylindrical portion of the second mounting member of the vibration-damping device, with high space utilization.

(9) A pneumatically operated fluid-filled active vibration-damping device according to any one of the above-indicated modes (1)–(4), further comprising a support member and a mass member that are elastically connected with each other via the elastic body, the support member being adapted to be attached to a subject member whose vibrations to be damped such that the mass member is elastically supported by the subject member via the elastic body. According to this mode of the invention, the elastic body as a spring component and the mass member as a mass component cooperate to form one vibration system. An application of the air pressure variation to the working air chamber causes oscillation of this vibration system, and the resonance of this vibration system is effectively utilized to apply an oscillating force corresponding to the vibrations to be damped to the subject member, so that the vibration-damping device capable of offsetting or actively damping vibrations is effectively provided.

(10) A pneumatically operated fluid-filled active vibration-damping device according to any one of the above-indicated modes (1)–(9), further comprising a shutoff mechanism for inhibiting a connection of the air reservoir to the working air chamber. This arrangement makes it possible to substantially eliminate the air reservoir depending upon vibration conditions of the subject member whose vibrations to be damped, objects of vibration damping, or the like. For instance, the shutoff mechanism may be operated to eliminate the air reservoir, when the air pressure variation is not applied to the working air chamber, or alternatively when the higher harmonic components of the primary frequency of the air pressure variation induced in the working air chamber is not concerned. Therefore, the shutoff mechanism is operable to prevent unnecessary increase in a volume of the working air chamber due to the presence of the air reservoir, as needed, e.g., for restricting the passive displacement of the movable member as a result of the fluid pressure variation in the primary fluid chamber, or alternatively for improving a response upon controlling the air pressure in the working air chamber.

(11) A pneumatically operated fluid-filled active vibration-damping apparatus comprising: a pneumatically operated fluid-filled active vibration-damping device defined in any one of the above-indicated modes (1)–(10) of the invention; an external air piping system independent of the vibration-damping device and connected to the working air chamber of the vibration-damping device in order to apply the air pressure variation to the working air chamber from an external area; a switch valve disposed on the air piping system and operable for alternately connecting the working air chamber to two pressure sources having different pressure values for generating the air pressure variation in the working air chamber. According to this mode of the invention, the air reservoir is effectively formed without needing a specific modification of the air piping system e.g., providing a branch pipe on the external air piping system, or undesirable increase in a required installation space of the air piping system. Thus, the vibration-damping apparatus according to this mode of the invention is applicable with ease to existing vibration-damping apparatus, for thereby assuring an improved vibration-damping effect.

BRIEF DESCRIPTION OF THE DRAWINGS

The forgoing and/or other objects features and advantages of the invention will become more apparent from the following description of preferred embodiments with reference to the accompanying drawings in which like reference numerals designate like elements and wherein.

DETAILED DESCRIPTION OF PREFERRED EMBODIMENTS

Figure 1:
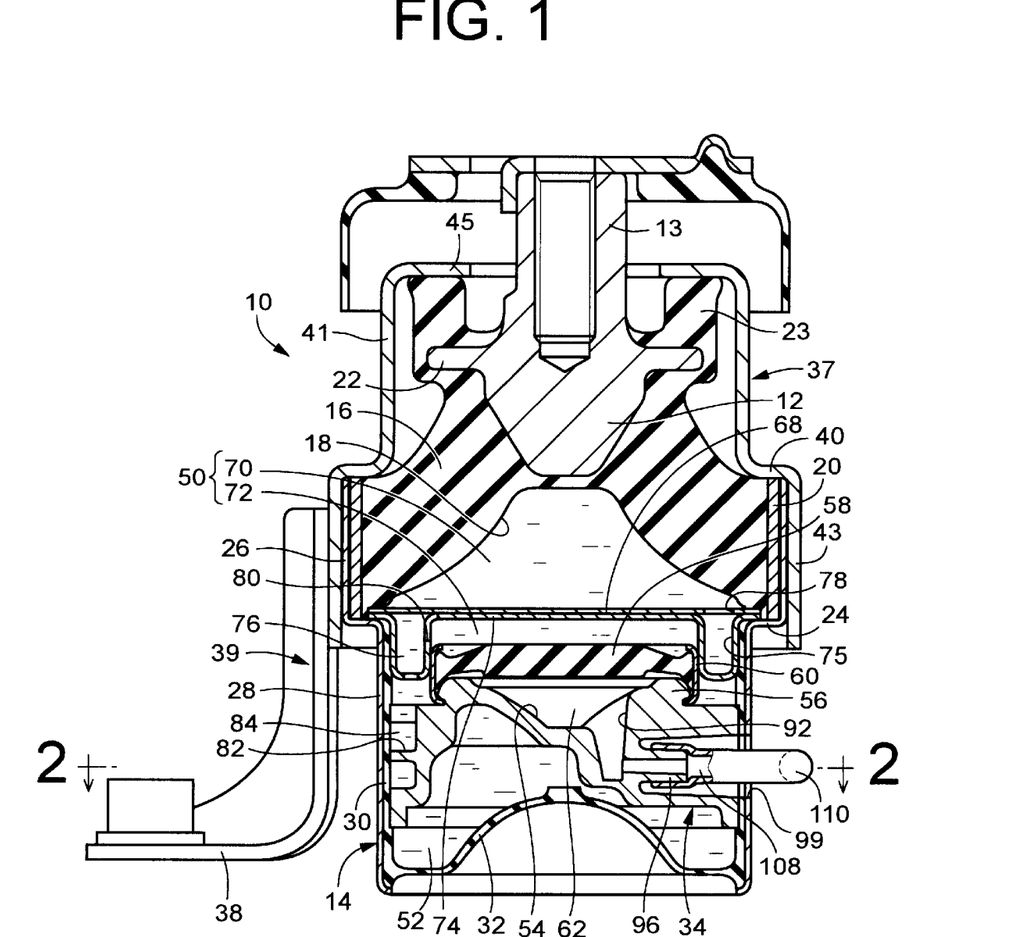
FIG. 1 is an elevational view in axial or vertical cross section of a pneumatically operated active vibration-damping device in the form of an engine mount for use in an automotive vehicle, which is constructed according to one preferred embodiment of the invention.
Figure 2:
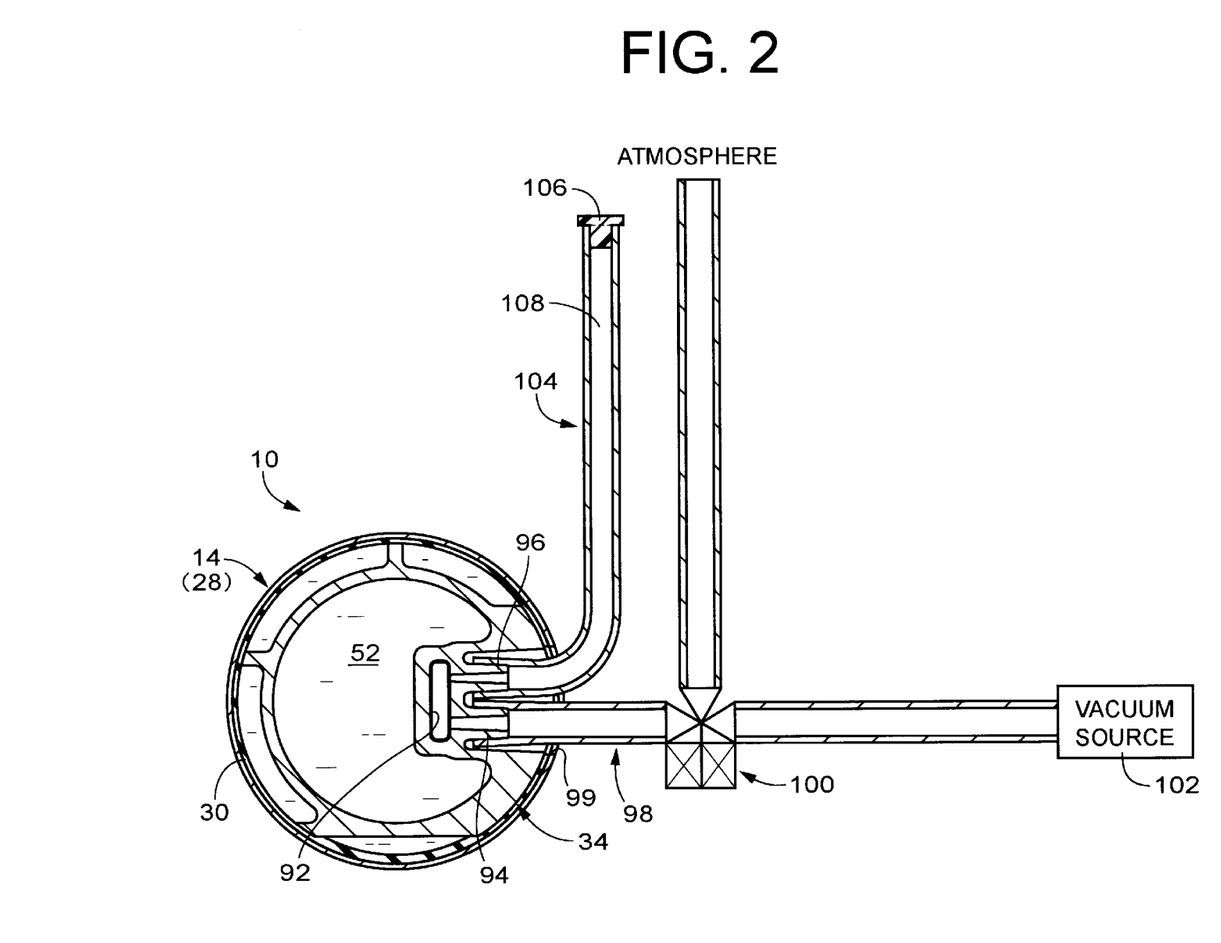
FIG. 2 is an elevational view in transverse cross-section of the engine mount of FIG. 1, taken along line 2—2 of FIG. 1.

Referring first to FIGS. 1 and 2, there is shown a first embodiment of the present invention in the form of an engine mount 10 for use in an automotive vehicle. The engine mount 10 includes first mounting member 12 and a second mounting member 14 which are both made of metal and are elastically connected with each other via an elastic body 16 made of rubber. The engine mount 10 is installed on the vehicle such that the first mounting member 12 is fixed to a power unit functioning as a vibrative member and the second mounting member 14 is fixed to a body of a vehicle functioning as a subject member whose vibrations to be damped, so that the power unit is elastically mounted on the body of the vehicle in a vibration-damping fashion. A vertical direction in the following description is basically oriented to the vertical direction as seen in FIG. 1.

The first mounting member 12 is a block member having a generally inverted frusto-conical shape, and includes a threaded mounting portion 13 integrally formed at its large diameter end face so as to extend axially outwardly or upwardly. The threaded mounting portion 13 has a tapped hole so that the first mounting member 12 is fixed to the power unit (not shown) with a bolt screwed in the tapped hole. A stop portion 22 is also integrally formed at an outer circumferential surface of the large diameter end portion of the first mounting member 12 so as to extend radially outwardly.

The elastic body 16 has a generally frusto-conical shape in its entirety whose diameter increases in an axially downward direction as seen in FIG. 1. The elastic body 16 has a recess 18 having an inverted mortar shape and open in its large diameter end face. The elastic body 16 is bonded to the first mounting member 12 in a process of vulcanization of a rubber material for forming the elastic body 16, such that the first mounting member 12 is partially embedded within a small diameter end portion of the elastic body 16, while being held in a concentric or coaxial relationship with the elastic body 16. A metallic sleeve 20 is superposed on and bonded to an outer circumferential surface of the large diameter end portion of the elastic body 16 in the above-mentioned vulcanization process. Accordingly, there is formed an integral vulcanization product including the first mounting member 12, the elastic body 16 and the metallic sleeve 20. In the integral vulcanization product, a rubber buffer 23, which is integrally formed with the elastic body 16, is formed on the stop member 22 of the first mounting member 12 so as to extend axially upwardly as seen in FIG. 1

The second mounting member 14 is a large diameter hollow cylindrical member having a shoulder portion 24 in its axially intermediate portion. The second mounting member 14 includes a large diameter portion 26 formed on the axially upper side of the shoulder portion 24 and a small diameter portion 28 formed on the axially lower side of the shoulder portion 24, as seen in FIG. 1. Inner circumferential surfaces of the large diameter portion 26 and the small diameter portion 28 are coated substantially entirely by a sealing rubber layer 30 that is bonded to these inner circumferential surfaces upon vulcanization of a rubber material for forming the sealing rubber layer 30. On the side of the small diameter portion 28, a flexible diaphragm 32 in the form of a disk-like thin rubber layer is disposed in an axially lower open end of the second mounting member 14, and bonded at its peripheral portion to a peripheral portion of the axially lower open end, upon vulcanization of a rubber material for forming the flexible diaphragm 32. Thus, the axially lower open end of the second mounting member 14 is fluid-tightly closed by the flexible diaphragm 32. In the present embodiment, the flexible diaphragm 32 is integrally formed with the sealing rubber layer 30.

The thus constructed second mounting member 14 is fixedly bonded to the outer circumferential surface of the elastic body 16 with the large diameter portion 26 of the second mounting member 14 being firmly fixed onto the metallic sleeve 20 by means of pressing, drawing or the like. In this state, the first and second mounting members 12, 14 are elastically connected with each other, while being disposed in a concentric or coaxial relationship with each other with a given axial spacing therebetween, and vibrations to be damped are primarily applied to the engine mount 10 in this axial direction (hereinafter, referred to as a primary vibration input direction where appropriate). With the large diameter portion 26 of the second mounting member 14 being fixedly bonded to the elastic body 16 as described above, an axially upper open end of the second mounting member 14 is fluid-tightly closed by the elastic body 16.

A cylindrical stop member 37 is inserted onto the second mounting member 14 from the axially upper side of the second mounting member 14, and an axially lower portion of the cylindrical stop member 37 is firmly fitted onto the large diameter portion 26 of the second mounting member 14. The cylindrical stop member 37 includes a shoulder portion 40 in its axially intermediate portion and a small diameter portion 41 and a large diameter portion 43 located on the axially upper and lower sides of the shoulder portion 40, respectively. The cylindrical stop member 37 further includes an annular abutting plate portion 45 that is integrally formed at an axially upper end portion so as to protrude radially inwardly. This abutting plate portion 45 is located above and opposed to the stop portion 22 of the first mounting member 12 with a given axial spacing therebetween. Upon application of an excessively large vibrational load to the engine mount 10, the stop member 22 is brought into abutting contact with the abutting plate portion 45 via the rubber buffer 23, for limiting an amount of displacement of the first and second mounting members 12, 14 relative to each other in a rebound direction in which the first and second mounting members 12, 14 are displaced away from each other. On an outer circumferential surface of the large diameter portion 43 of the cylindrical stop member 37, a bracket 39 is fixed by welding so as to extend axially downwardly as seen in FIG. 1. Axially lower end portion of the bracket 39 is bent outwardly at generally right angles, thereby forming an integrally formed fixing portion 38. Therefore, the bracket 39 and the second mounting member 14 is fixedly mounted at the fixing portion 38 on the body of the vehicle (not shown).

The second mounting member 14 houses a partition member 34 so that the partition member 34 is located at an intermediate portion between the elastic body 16 and the flexible diaphragm 32. The partition member 34 is a thick-walled cylindrical block member made of rigid materials such as metal and a synthetic resin material. This partition member 34 is firmly fitted into the small diameter portion 28 of the second mounting member 14, e.g., by pressing the partition member 34 into the small diameter portion 28, or by drawing radially inwardly the small diameter portion 28, so that an outer circumferential surface of the partition member 34 is fluid-tightly fitted onto an inner circumferential surface of the small diameter portion 28 with the sealing rubber layer 30 compressed in between. With the partition member 34 assembled within the second mounting member 14, an internal area defined by and between the elastic body 16 and the flexible diaphragm 32 and fluid-tightly enclosed from the external area, is fluid-tightly divided by the partition member 34 into two parts, namely a primary fluid chamber 50 partially defined by the elastic body 16 and located on the axially upper side of the partition member 34, and an equilibrium chamber 52 partially defined by the flexible diaphragm 32 and located on the axially lower side of the partition member 34. The volume of the equilibrium chamber 52 easily varies due to a deformation of the flexible diaphragm 32.

These primary fluid chamber 50 and the equilibrium chamber 52 are both filled with a non-compressible fluid such as water, alkylene glycol, polyalkylene glycol and silicone oil. For assuring the present engine mount 10 to exhibit an excellent damping effect based on resonance of the fluid, which will be described later, it is preferable to select fluids having a viscosity of not higher than 0.1 Pa·s. Filling of these primary fluid chamber 50 and the equilibrium chamber 52 with the non-compressible fluid may be effectively accomplished by assembling the integral vulcanized products including the first mounting member 12, the metallic sleeve 20 and the elastic body 16 with the second mounting member 14 equipped with the flexible diaphragm 32 and the partition member 34 within a mass of the fluid.

The partition member 34 has a central recess 54 open in its axially upper end face with a generally mortar configuration, and an annular engaging projection 56 that is integrally formed at a peripheral portion of the opening of the central recess 54 so as to protrude axially upwardly from the axially upper end face of the partition member 34. A movable member in the form of a movable rubber elastic plate 58 has a disk-like shape with a given wall thickness, and is superposed on an opening portion of the central recess 54. A hollow cylindrical engaging member 60 made of metal is bonded to an outer circumferential surface of the movable rubber elastic plate 58. An axially lower open-end portion of the engaging member 60 is disposed radially outwardly on the annular engaging projection 56 of the partition member 34 and is fluid-tightly fixed by caulking or crimping to the engaging projection 56. As a result, the opening of the central recess 54 is fluid-tightly closed by the movable rubber elastic plate 58, thereby providing a working air chamber 62, which is independent of the primary fluid chamber 50 and the equilibrium chamber 52. To the working air chamber 62, a suitable air pressure variation is applied from the external area, so that a suitable oscillating force is applied to the movable rubber elastic plate 58 based on the air pressure variation induced in the working air chamber 62.

Within the primary fluid chamber 50, which is formed between the elastic body 16 and the partition member 34, a disk-shaped partition plate 68, which is made of rigid material such as metal and a synthetic resin material, is disposed so as to extend in a radial direction perpendicular to the axial direction of the second mounting member 14. The partition plate 68 is fixed to the second mounting member 14 such that the outer peripheral portion of the partition plate 68 is forcedly gripped by and between the shoulder portion 24 of the second mounting member 14 and the large diameter end face of the elastic body 16. The thus disposed partition plate 68 divides the primary fluid chamber 50 into two sections on the axially opposite sides thereof, namely a pressure-receiving chamber 70 defined by and between the elastic body 16 and the partition plate 68, and an oscillating chamber 72 defined by and between the partition plate 68 and the partition member 34. Upon application of the vibration to the elastic mount 10, the pressure of the fluid in the pressure-receiving chamber 70 varies due to elastic deformation of the elastic body 16. The oscillating chamber 72, on the other hand, is partially defined by the movable rubber elastic body 58, and the pressure of the fluid in the oscillating chamber 72 is actively or directly changed due to the oscillation of the movable rubber elastic plate 58 caused by the air pressure variation induced in the working air chamber 62.

The partition plate 68 is superposed on an orifice member 74, which is a generally disk-shaped member made of a rigid material such as metal and a synthetic resin material. The orifice member 74 is also fixed to the second mounting member 14 such that an outer peripheral portion of the orifice member 74 is forcedly gripped by and between the shoulder portion 24 and the large diameter end portion of the elastic body 16 in the axial direction, together with the partition plate 68. The orifice member 74 has an annular groove 75 formed in an outer circumferential portion thereof, open in its upper surface, and extending in its circumferential direction. The opening of the annular groove 75 is fluid-tightly closed by the partition plate 68, thereby providing an orifice passage 76 extending circumferentially. This orifice passage 76 is held in fluid communication via a communication hole 78 with the pressure-receiving chamber 70 and via a communication hole 80 with the oscillating chamber 72. Thus, the orifice passage 76 permits flows of the fluid therethrough between the pressure-receiving chamber 70 and the oscillating chamber 72 due to the pressure difference between these two chambers 70, 72, which is caused upon application of the vibrational load to the engine mount 10. Meanwhile, an inner circumferential wall portion of the annular groove 75 is radially outwardly disposed on and held in close contact with the engaging member 60 bonded to the other peripheral portion of the movable rubber elastic plate 58. As a result, the oscillating chamber 72 is substantially defined by and between the movable rubber elastic plate 58 and the orifice member 74.

As is apparent from FIGS. 3–7, the partition member 34 includes a first circumferential groove 82 as a second groove formed in its axially upper end portion so as to be open in its outer circumferential surface and extend in its circumferential direction with a circumferential length approximately equal to a half of the circumference of the partition member 34. The opening of the first circumferential groove 82 is fluid-tightly closed by the small diameter portion 28 of the second mounting member 14, thereby forming a fluid passage 84. One of circumferentially opposite ends of the fluid passage 84 is held in fluid communication with the pressure-receiving chamber 70 through an upper communication passage 86 formed by cutting off an axially upper portion in the outer circumferential surface of the partition member 34, a communication hole 88 formed through the orifice member 74, and the orifice passage 76. The other end of the fluid passage 84 is held in fluid communication with the equilibrium chamber 52 through a lower communication passage 90 formed by cutting off an axially lower portion in the outer circumferential surface of the partition member 34. Therefore, the pressure-receiving chamber 70 and the equilibrium chamber 52 are held in fluid communication with each other through the fluid passage 84. Upon application of vibrational loads to the engine mount 10, the pressure of the fluid in the pressure-receiving chamber 70 is changed due to the elastic deformation of the elastic body 16, and flows of the fluid through the fluid passage 84 are caused due to the pressure difference between the pressure-receiving chamber 70 and the equilibrium chamber 52. Thus, the engine mount 10 can exhibit an excellent passive damping effect with the help of resonance of the fluid flowing through the fluid passage 84.

In the present embodiment, the orifice passage 76 is tuned to a frequency range higher than a frequency range to which fluid passage 84 is tuned. Described in detail, by way of example, a length and a cross sectional area of the fluid passage 84 are suitably determined so that the engine mount 10 can exhibit an excellent vibration-damping effect with respect to low frequency large amplitude vibrations, such as engine shakes, with the help of resonance of the fluid flowing through the fluid passage 84. On the other hand, a length and a cross sectional area of the orifice passage 76 for a fluid communication between the oscillating chamber 72 and the pressure-receiving chamber 70, are suitably determined so that the engine mount 10 can exhibit an excellent vibration isolating effect with respect to high frequency small amplitude vibrations, such as engine idling vibrations or booming noises, with the help of resonance of the fluid flowing through the orifice passage 76, and that the resonance of the fluid flowing through the orifice passage 76 also permits an efficient transmission to the pressure-receiving chamber 70 of a fluid pressure variation induced in the oscillating chamber 72 caused by the oscillation of the movable rubber elastic plate 58 due to the air pressure variation induced in the working air chamber 62, which will be described later, thus allowing the engine mount 10 to exhibit a high active vibration-damping effect as a result of fluid pressure control in the pressure-receiving chamber 70.

The partition member 34 further includes a rectangular pocket 92 open in a bottom-side portion of an inner circumferential surface of the central recess 54 and extending axially downwardly. A circumferential wall portion of the pocket 92 is formed with a first port 94 as a second outlet and a second port 96 as a first outlet. The first and second ports 94, 96 are open in a bottom-side portion of an inner circumferential surface of the pocket 92 and protrude radially outwardly in the direction perpendicular to the axis of the second mounting member 14.

As is shown in FIG. 2, an external air piping system 98 is connected to the tip end of the first port 94, such that the external air piping system 98 extends radially outwardly from the first port 94 to the outside of the engine mount 10 through a window 99 formed through the small diameter portion 28 of the second mounting member 14. The external air piping system 98 is alternately connectable to two air sources in the form of a vacuum source 102 and the atmosphere, via a three-way solenoid operated switch valve 100. This three-way solenoid operated switch valve 100 is operated based on a drive signal received from a suitable controller so that the first port 94 is alternately connected to and disconnected from the vacuum source 102 and the atmosphere based on a switching operation of the switch valve 100. The vacuum source 102 may be prepared by utilizing a negative pressure available from an air intake port of an internal combustion engine of the vehicle, or a suitable vacuum pump, and may be connected to the switch valve 100 directly or via a suitable vacuum tank or the like. Any controller may be employed for the controller of the switch valve 100, so long as it is capable of controlling the switch valve 100 at a frequency and a phase corresponding to those of vibrations to be damped. Examples of employable controllers include: a controller that controls the switching operation of the switch valve 100 in a feed back control manner wherein an ignition pulse signal generated from the internal combustion engine of the vehicle is utilized as a reference signal, and a vibration excited in the body of the vehicle as a subject member whose vibrations to be damped is utilized as an error signal; and a controller that controls the switching operation of the switch valve 100 in a feed forward fashion based on a detected signal indicative of conditions of a transmission of the vehicle, a detected signal indicative of the amount of operation of an accelerator pedal, a detected signal indicative of the vehicle running speed, or the like, as well as the ignition pulse signal, according to a data map prepared in advance.

As a result of the switching operation of the switch valve 100 under control of the suitable controller, suitable air pressure variation at a frequency and a phase corresponding to those of vibrations to be damped is applied to the working air chamber 62 through the external air piping system 98, the first port 94 and the pocket 92 in this order. This air pressure variation applied to the working air chamber 62 then causes the oscillation of the movable rubber elastic plate 58, thereby actively inducing fluid pressure variation in the oscillating chamber 72.

On the other hand, a closed tubular pipe 104 is connected to the tip end of the second port 96. Like the external air piping system 98, the closed tubular pipe 104 extends radially outwardly from the second port 96 to the outside of the engine mount 10 through the window 99 formed through the small diameter portion 28 of the second mounting member 14. This closed tubular pipe 104 is formed with a length that is corresponding to a wavelength of higher harmonic components in the air pressure variation induced in the working air chamber 62, which does not correspond to a frequency of vibrations to be damped, so that the closed tubular pipe 104 exhibits a damping or attenuating effect with respect to the higher harmonic components based on resonance effects thereof. It should be appreciated that the term "higher harmonic components" should be interpreted to mean a higher harmonic component of a primary frequency of the air pressure variation in the working air chamber 62 in a strict sense, and any other subsidiary frequency components as well. The protruding end portion of the closed tubular pipe 104 is fluid-tightly closed by a cover member 106. These external air piping system 98 and the closed tubular pipe 104 may be suitably formed of tubular members made of synthetic resin materials, metal or other rigid materials not to be deformed by the air pressure variation passing therethrough.

In the engine mount 10 constructed as described above, the air pressure variation with a frequency and a phase corresponding to those of vibrations to be damped is applied to the working air chamber 62 through the external air piping system 98, so as to oscillate the movable rubber elastic plate 58, making it possible to actively control the pressure of the fluid in the pressure-receiving chamber 70 via the oscillating chamber 72, allowing the engine mount 10 to exhibit an active vibration-damping effect. While the air pressure variation applied to the working air chamber 62 is also applied to a resonance area 108 formed within the closed tubular pipe 104 to function as an air reservoir. With the help of the resonance effect caused by the resonance area 108, a specific frequency component (e.g., the higher harmonic components) in the air pressure variation in the working air chamber 62 is effectively reduced or attenuated. This makes it possible to induce in the working air chamber 62 a desired air pressure variation highly corresponding to vibrations to be damped. Therefore, the engine mount 10 can exhibit a further improved damping effect as a result of an excellent fluid pressure control in the pressure-receiving chamber 70 as described above.

In the engine mount 10 as described above, the resonance area 108 is formed by directly assembling the closed tubular pipe 104 with the engine mount 10, thus making it possible to form the resonance area 108 without needing a modification of a structure of the external air piping system 98 and a resultant modification of a space for installing the external air piping system 98. Therefore, the engine mount 10 permits an easy formation of the resonance area 108, and is able to improve vibration damping characteristics thereof in comparison with a conventional pneumatically active vibration-damping device having no resonance area.

Since the closed tubular pipe 104 is formed to protrude directly from the engine mount 10, the closed tubular pipe 104 may be effectively installed within a space prepared for installing the engine mount 10 on the vehicle. For instance, if the closed tubular pipe 104 has a relatively large length, the closed tubular pipe 104 may be modified to extend circumferentially around the engine mount 10 so that the closed tubular pipe 104 can be installed within the space for the engine mount 10.

Further, since the resonance area 108 is directly open to the working air chamber 62, the resonance area 108 is operable to directly reduce or attenuate the higher harmonic components generated in the air pressure variation in the working air chamber 62. This arrangement makes it possible to reduce or attenuate the higher harmonic components of the air pressure variation in the working air chamber 62 in a further improved and stable manner, in comparison with the case where a resonance area is formed on a portion of the external air piping system 98, for example.

In addition, both of the external air piping system 98 and the closed tubular pipe 104 are open in an inner circumferential surface of the pocket 92 that is formed within a part of the working air chamber 62 so that the air pressure variation is introduced into the pocket 92 before reaching the working air chamber 62. Accordingly, the higher harmonic components in the air pressure vibration in the pocket 92 can be effectively reduced with the help of the resonance effect of the resonance area 108, before the air pressure variation reaches the working air chamber 62. It is therefore effectively prevented or minimized that the higher harmonic components in the air pressure variation in the working air chamber 62 adversely effect on the movable rubber elastic plate 58.

While the presently preferred embodiments of the invention has been described above for illustrative purpose only, it is to be understood that the invention is not limited to the details of the illustrated embodiments, but may be otherwise embodied.

For instance, the present invention is applied to the engine mount for use in the automotive vehicle, in the illustrated embodiment, the principle of the present invention may also be applicable to a body mount, a suspension bushing or other vibration-damping couplings or supports for use in various kinds of devices other than the automotive vehicle.

The principle of the present invention may be similarly applicable to an active dynamic damper that is installed on a subject member whose vibrations to be damped to exhibit a desired damping effect with respect to vibrations excited in the member. Such an active dynamic damper may be provided, for example, such that the first mounting member 12 of the engine mount 10 according to the illustrated embodiment is fixed to the body or other members of the vehicle whose vibrations to be damped, while the second mounting member 14 is permitted to be freely displaced. Thus, the active dynamic damper having the elastic body 16 functioning as a spring system and the second mounting member 14 functioning as the mass system can be provided.

While the closed tubular pipe 104 is connected to the working air chamber 62 via the pocket 92 formed within the working air chamber 62 in the illustrated embodiment, it may be possible to directly connect the closed tubular pipe 104 to the working air chamber 62. The closed tubular pipe 104 may be open in a portion of the working air chamber 62 that is remote from a portion in which the external working air chamber 98 is open.

Figure 3:
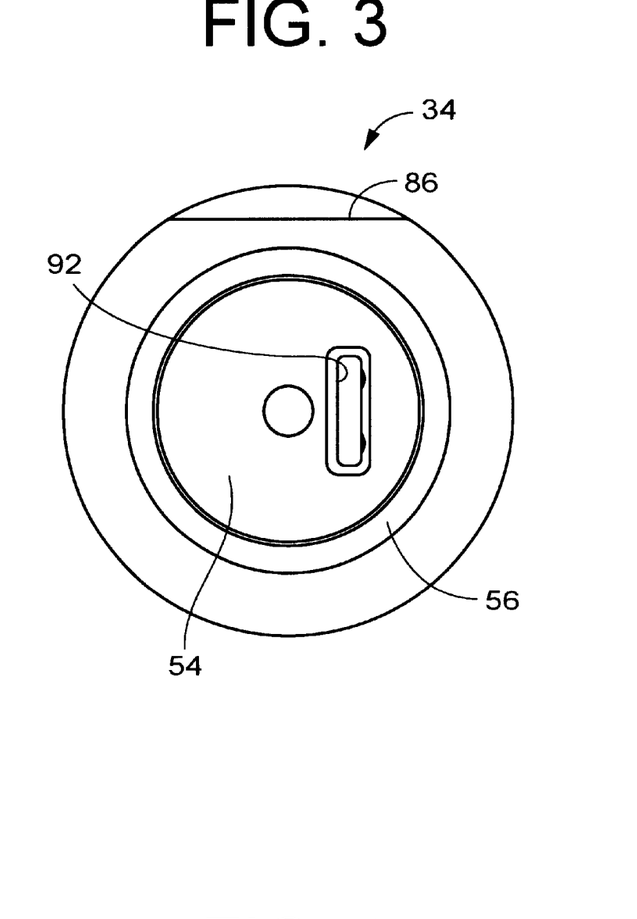
FIG. 3 is a plane view of a partition member of the engine mount of FIG. 1.
Figure 4:
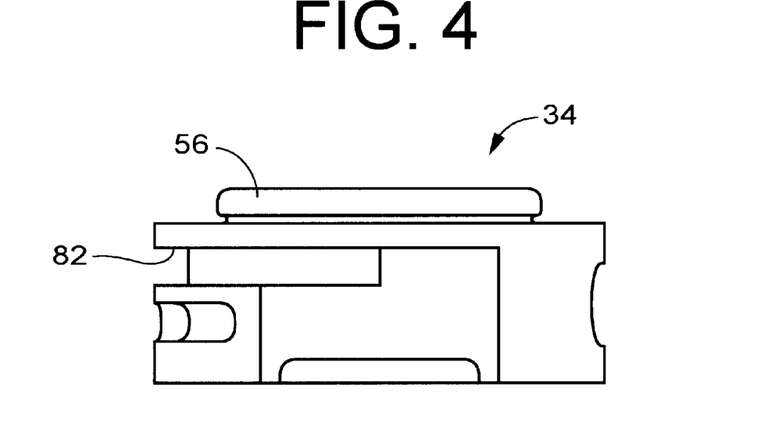
FIG. 4 is a bottom side elevational view of the partition member of FIG. 3.
Figure 5:
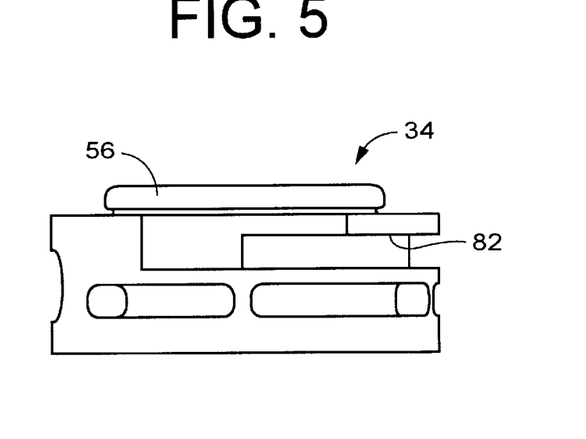
FIG. 5 is a topside elevational view of the partition member of FIG. 3.
Figure 6:
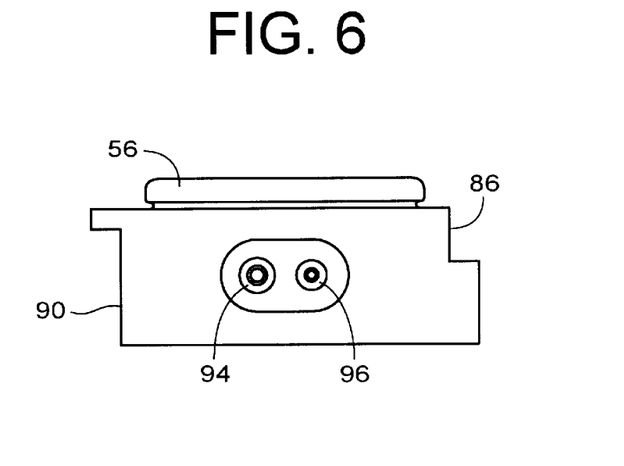
FIG. 6 is a right side elevational view of the partition member of FIG. 3.
Figure 7:
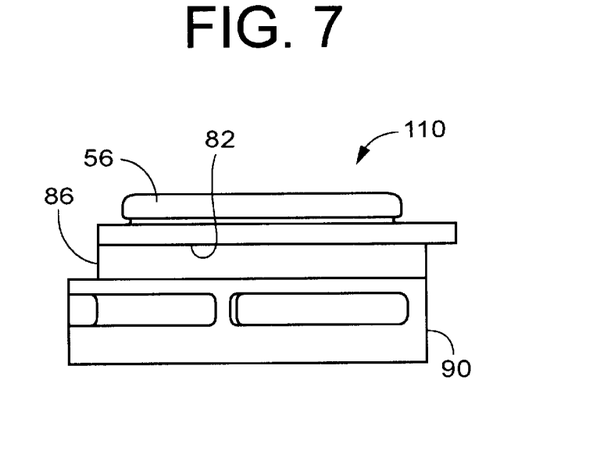
FIG. 7 is a left side elevational view of the partition member of FIG. 3.
Figure 8:
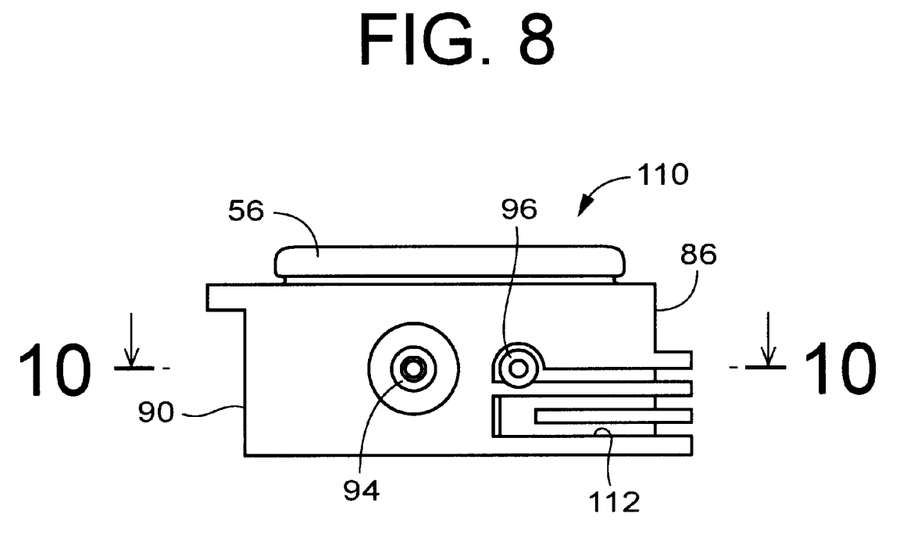
FIG. 8 is another example of a partition member usable in the engine mount of FIG. 1.
Figure 9:
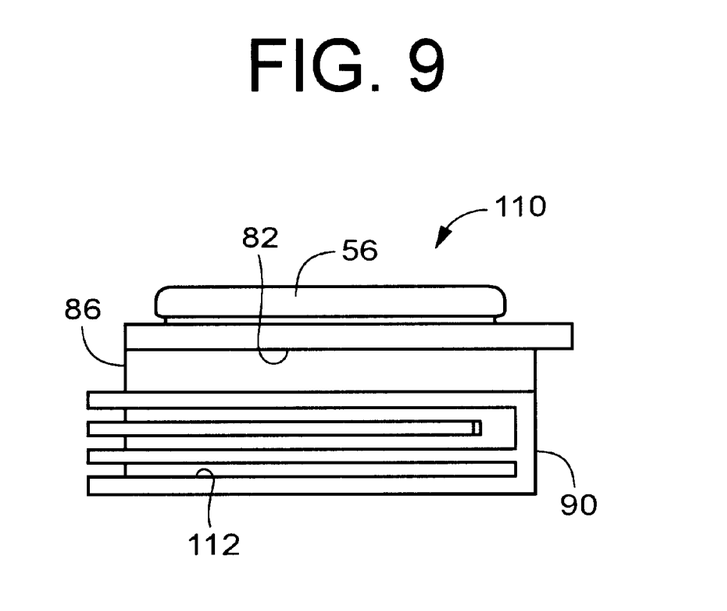
FIG. 9 is a right side elevational view of the partition member of FIG. 8.
Figure 10:
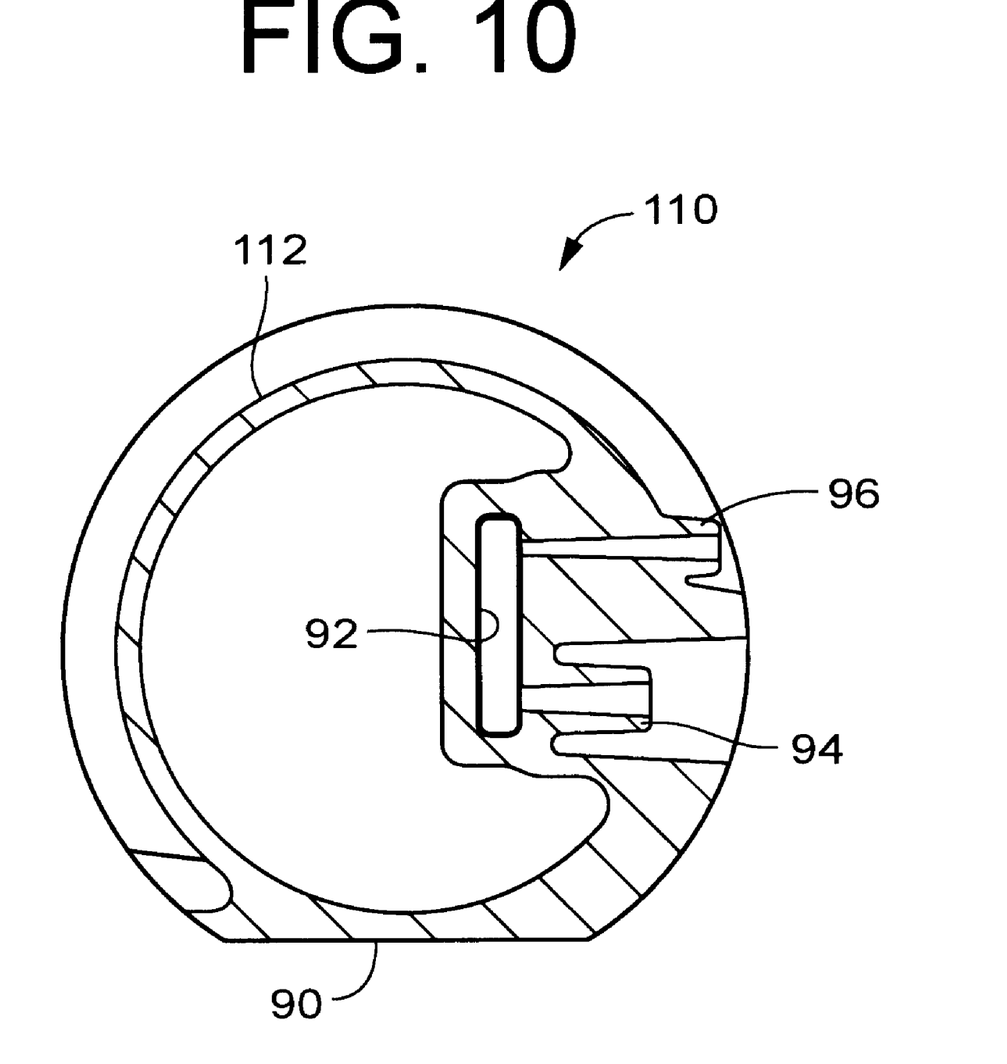
FIG. 10 is a cross sectional view taken along line 10—10 of FIG. 8.

In the illustrated embodiment, the closed tubular pipe 104 is directly connected to the second port 96 open to the working air chamber 62, and protrudes outwardly from the second port 96, thereby forming the resonance area 108 substantially entirely outside the second mounting member 14. However, it may be possible to form the resonance area inside the second mounting member 14. FIGS. 8–10 show specific examples of modifications of the partition member 110, which are employable in the engine mount 10 of the illustrated embodiment, in order to form the resonance area inside the second mounting member 14. As shown in FIGS. 8 and 9, a partition member 110 includes a second circumferential groove 112 as a first groove formed in an area located in an axially lower half portion thereof and extending circumferentially over a generally half of the circumference thereof. The second circumferential groove 112 continuously extends circumferentially in zigzag with a total circumferential length substantially equal to one and a half of the circumference of the partition member 110. The second circumferential groove 112 is formed in the area that is remote from the portions in which the upper and lower communication passages 86, 90, the first circumferential groove 82 and the first port 94 are formed, and is independent of these members 86, 90, 82 and 94. One of opposite ends of the second circumferential groove 112 is connected to the second port 96, and is held in fluid communication with the working air chamber 62 through the second port 96, the pocket 92. The other end of the second circumferential groove 112 is fluid-tightly closed. With the partition member 110 assembled within the second mounting member 14, the opening of the second circumferential groove 112 is fluid-tightly closed by the small diameter portion 28 of the second mounting member 14, like the illustrated embodiment, thereby providing a resonance area extending from the working air chamber 62 via the second port 96, and extending along the inner circumferential surface of the small diameter portion 28 of the second mounting member 14 with a given length. Meanwhile, a plane view of the partition member 110 is omitted since it is equal to that of the partition member 34 as shown in FIG. 3. The same reference numerals as used in FIGS. 3–7 are used to denote corresponding elements or portions of the embodiments shown in FIGS. 8–10, and redundant description of those elements or portions are not provided.

The shape of the air reservoir is not limited to that of the illustrated embodiment, but may be suitably determined taking into account a given space. The air reservoir needs not to have a constant shape in cross section. It is also possible to employ an air reservoir having bent or curve.

While the primary chamber 50 is divided into the pressure-receiving chamber 70 and the oscillating chamber 72, which are held in fluid communication with each other through the orifice passage 76, it may be possible to use the primary fluid chamber 50 as a single fluid chamber.

The fluid passage 84 and the equilibrium chamber 52 connected to the primary fluid chamber 50 are not essential for practicing the present invention, but may be suitably employed depending upon required vibration-damping characteristics.

While the vacuum source 102 and the atmosphere are employed as air pressure sources in the illustrated embodiment, a plurality of air pressure sources having different values may be employed in suitable combinations, e.g., a pair of a vacuum source and a positive pressure source and a pair of the positive pressure source and the atmosphere.

It is also to be understood that the present invention may be embodied with various other changes, modifications and improvements, which may occur to those skilled in the art, without departing from the spirit and scope of the invention defined in the following claims.

What is claimed is:

1. A pneumatically operated fluid-filled active vibration-damping device comprising,
   an elastic body elastically deformed due to vibrational loads a lied thereto;
      a primary fluid chamber partially defined by said elastic body and filled with a non-compressible fluid;
      a movable member being elastically displaceable and partially defining said primary fluid chamber on one of opposite sides thereof;
      a working air chamber disposed an other one of opposite sides of said movable member; and
      an air reservoir directly extending from said working air chamber and fluid-tightly closed at a protruding end portion thereof;
      wherein a fluid pressure variation in said primary fluid chamber is induced by an elastic deformation of said elastic body while being actively controlled by transmitting an air pressure variation a lied to said working air chamber from an external area to said primary fluid chamber via said movable member, and
   wherein a wall of said working air chamber is formed with a first outlet adapted to be connected with a closed tubular pipe for forming said air reservoir, and a second outlet adapted to be connected with an external air piping system for applying said air pressure variation to said working air chamber.

2. A pneumatically operated fluid-filled active vibration-damping device according to claim 1, further comprising a first mounting member and second mounting member that are elastically connected with each other via said elastic body, wherein said first mounting member is adapted to be attached to a vibrative member and said second mounting member is adapted to be attached to a subject member whose vibrations to be damped so that said vibration-damping device is interposed between the vibrative member and the subject member for elastically connecting the vibrative member and the subject member in a vibration-damping fashion.

3. A pneumatically operated fluid-filled active vibration-damping device according to claim 2, wherein said elastic body has a generally frusto-conical shape and is bonded at a small diameter end portion thereof to said first mounting member, and said second mounting member having a cylindrical portion, while one of axially opposite open ends of said cylindrical portion of said second mounting member is bonded to an outer circumferential surface of a large diameter end portion of said elastic body to be fluid-tightly closed, and a other one of axially opposite open ends of said cylindrical portion of said second mounting ember is fluid-tightly closed by a flexible diaphragm elastically deformable, said vibration-damping device further comprising:
   a partition member fixedly disposed within a bore of said cylindrical portion of said second mounting member such that said partition member extends in a radial direction perpendicular to an axis of said cylindrical portion so as to form said primary fluid chamber partially defined by said elastic body on one of opposite sides thereof and an auxiliary fluid chamber partially defined by said flexible diaphragm and filled with said non-compressible fluid on an other one of opposite sides thereof; and
   a fluid passage for permitting a fluid communication between said primary fluid chamber and said auxiliary fluid chamber,
   wherein said partition member includes a recess open to aid primary fluid chamber and being closed by said movable member so as to form said working air chamber on one of opposite sides of said movable member, which is remote from said primary fluid chamber, an external air piping system for applying said air pressure variation to said working air chamber from said external area and said air reservoir being open in an inner surface of said recess of said partition member.

4. A pneumatically operated fluid-filled active vibration-damping device according to claim 3, wherein said partition member includes a first groove open in outer circumferential surface thereof, and an opening of said first groove is fluid-tightly close by said cylindrical portion of said second mounting member so as to at least partially form aid air reservoir.

5. A pneumatically operated fluid-filled active vibration-damping device according to claim 4, wherein said partition member further includes a second groove open in said outer circumferential surface thereof and independent of said first groove, and an opening of said second groove is fluid-tightly closed by said cylindrical portion of said second mounting member so as to form said fluid passage.

6. A pneumatically operated fluid-filled active vibration-damping device according to claim 1, further comprising a pocket having a volume smaller than that of said working air chamber, wherein said pocket is open in a portion of said wall of said working air chamber, and said first and second outlets formed at respective portions of said pocket.

7. A pneumatically operated fluid-filled active vibration-damping device according to claim 1, wherein said movable member has an elasticity by which said movable member is restored to an initial shape thereof.

8. A pneumatically operated fluid-filled active vibration-damping device according to claim 1, wherein said primary fluid chamber includes a pressure receiving chamber partially defined by said elastic body and an oscillating chamber partially defined by said movable member, said pressure receiving chamber and said oscillating chamber are held in fluid communication with each other via an orifice passage.

9. A pneumatically operated fluid-filled active vibration-damping device according to claim 1, further comprising a support member and a mass member that are elastically connected with each other via said elastic body, said support member being adapted to be attached to a subject member whose vibrations to be damped such that said mass member is elastically supported by the subject member via said elastic body.

10. A pneumatically operated fluid-filled active vibration-damping device according to claim 1, further comprising a shutoff mechanism for in inhibiting a connection of said air reservoir to said working air chamber.

11. A pneumatically operated fluid-filled active vibration-damping apparatus comprising:

a pneumatically operated fluid-filled active vibration-damping device including: an elastic body elastically deformed due to vibrational loads applied the to; a primary fluid chamber partially defined by said elastic body and filled with a non-compressible fluid; a movable member being elastically displaceable and partially defining said primary fluid chamber on one of opposite sides thereof a working air chamber disposed an other one of opposite sides of said movable member, which is remote from said primary fluid chamber; and an air reservoir directly extending from said working air chamber and fluid-tightly close at its protruding end portion;

an external air piping system independent of said vibration-damping device and connected to said working air chamber of said vibration-damping device in order to apply an air pressure variation to said working air chamber from an external area;

a switch valve disposed on said air piping system and operable for alternately connecting said working air chamber to two air pressure sources having different pressure values for generating said air pressure variation in said working air chamber, wherein a wall of said working air chamber is formed with a first outlet adapted to be connected with a closed tubular pipe for forming said air reservoir, and a second outlet adapted to be connected with said external air piping system for applying said air pressure variation to said working air chamber.

* * * * *